(12) United States Patent
Augustine et al.

(10) Patent No.: US 9,104,715 B2
(45) Date of Patent: Aug. 11, 2015

(54) SHARED DATA COLLECTIONS

(75) Inventors: Matthew S. Augustine, Seattle, WA (US); John Burkhardt, Arlington, MA (US); Brian M. Lambert, Redmond, WA (US); Raymond E. Ozzie, Seattle, WA (US); Jason E. Schleifer, Cambridge, MA (US); Richard Z. Speyer, Cambridge, MA (US); Paresh S. Suthar, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 618 days.

(21) Appl. No.: 12/821,971

(22) Filed: Jun. 23, 2010

(65) Prior Publication Data

US 2011/0320407 A1    Dec. 29, 2011

(51) Int. Cl.
G06F 7/00 (2006.01)
G06F 17/30 (2006.01)

(52) U.S. Cl.
CPC ............... *G06F 17/30351* (2013.01)

(58) Field of Classification Search
CPC ..... G06F 17/30351; G06F 8/315; G06F 8/20; G06F 9/4435
USPC .......................................... 707/704; 709/203
See application file for complete search history.

(56) References Cited

U.S. PATENT DOCUMENTS

| | | | |
|---|---|---|---|
| 5,293,600 A | 3/1994 | Vriezen | |
| 5,408,470 A * | 4/1995 | Rothrock et al. | 370/261 |
| 5,546,572 A * | 8/1996 | Seto et al. | 707/999.005 |
| 6,128,615 A | 10/2000 | Molloy | |
| 6,148,301 A * | 11/2000 | Rosenthal | 707/999.003 |
| 6,324,587 B1 | 11/2001 | Trenbeath et al. | |
| 6,711,595 B1 | 3/2004 | Anantharao | |

(Continued)

FOREIGN PATENT DOCUMENTS

| | | |
|---|---|---|
| CN | 101495976 A | 7/2009 |
| CN | 101615203 A | 12/2009 |

(Continued)

OTHER PUBLICATIONS

Cohen, Norman H., "A Java Framework for Mobile Data Synchronization", Fifth IFCIS International Conference on Cooperative Information Systems (CoopIS'2000), Sep. 6-8, 2000, pp. 1-12.

(Continued)

*Primary Examiner* — Cheyne D Ly
(74) *Attorney, Agent, or Firm* — Judy Yee; Micky Minhas

(57) ABSTRACT

A data sharing mechanism may allow programs to share access to data collections. The mechanisms that implement the sharing may allow programs written in any language to read and write a shared collection. The mechanisms may make the shared nature of the collection relatively transparent to the program and to the programmer, by allowing a program to operate on the data more or less as if it were purely local data. The sharing of collections may be managed by a shared object runtime on each machine on which a collection is used, and by a shared object server. The shared object server maintains the true state of the collection, and deterministically resolves collections when programs operate on the same collection without knowledge of each other's operations. The mechanisms by which collections are shared may be implemented so as to be agnostic as to the kind of data in the collection.

20 Claims, 6 Drawing Sheets

(56) References Cited

U.S. PATENT DOCUMENTS

| | | |
|---|---|---|
| 6,789,252 B1 | 9/2004 | Burke et al. |
| 7,120,687 B1* | 10/2006 | Tessman et al. ............... 709/224 |
| 7,383,291 B2 | 6/2008 | Guiheneuf et al. |
| 2001/0000811 A1* | 5/2001 | May et al. ...................... 709/205 |
| 2003/0167264 A1* | 9/2003 | Ogura et al. ....................... 707/3 |
| 2003/0172054 A1 | 9/2003 | Berkowitz et al. |
| 2004/0003352 A1 | 1/2004 | Bargeron et al. |
| 2004/0015517 A1* | 1/2004 | Park et al. .................. 707/104.1 |
| 2005/0076098 A1* | 4/2005 | Matsubara et al. ............ 709/219 |
| 2005/0218739 A1* | 10/2005 | Maddin et al. ................. 310/120 |
| 2007/0078852 A1 | 4/2007 | Chen et al. |
| 2007/0174764 A1* | 7/2007 | Roseway et al. .............. 715/515 |
| 2007/0276836 A1 | 11/2007 | Chatterjee et al. |
| 2008/0059519 A1 | 3/2008 | Grifftih |
| 2009/0254571 A1 | 10/2009 | Cassel et al. |
| 2011/0289514 A1 | 11/2011 | Augustine et al. |

FOREIGN PATENT DOCUMENTS

| | | |
|---|---|---|
| CN | 102893272 A | 1/2013 |
| EP | 1443423 A1 | 8/2004 |
| JP | H09-244936 A | 9/1997 |
| JP | 2005011354 A | 1/2005 |

OTHER PUBLICATIONS

Moore, et al, "Rule-Based Distributed Data Management", retrieved at << http://oceanobservatories.org/spaces/download/attachments/16421632/IRODS_Reagan_ILM-08-04-30.ppt >>, retrieved date Mar. 15, 2010, dated Apr. 30, 2008, 45 pages.

"Overview: Data Management & iRODS", retrieved at << https://www.irods.org/pubs/iRODS_Overview_0903.pdf >>, retrieved date Mar. 15, 2010, 36 pages.

"Google Wave", retrieved at << http://en.wikipedia.org/wiki/Google_Wave >>, last modified date Jun. 14, 2010, retrieved date: Jun. 18, 2010, 6 pages.

"International Search Report and Written Opinion of the International Searching Authority", Mailed Date: Jan. 2, 2012, Application No. PCT/US2011/040235, Filed Date: Jun. 13, 2011, 9 pages.

Search Report in Chinese Patent Application No. 201180030891, dated Jun. 20, 2013, 1 page.

"First Office Action Issued in Japanese Patent Application No. 2013-516603", Mailed Date: Jan. 5, 2015, 6 pages.

* cited by examiner

SHARED DATA COLLECTIONS

BACKGROUND

A collection is a group of data items that are to be operated on together. Some examples of collections include lists, arrays, sets, bags, and various other groupings of data. In the early days of programming, programs were typically monolithic entities that did not interoperate with each other. Thus, programs were able to manage collections internally in whatever manner the programmer chose. In modern programming, however, it has become a more prevalent practice for different instances of the same program, or different programs, to interoperate with each other by manipulating a shared set of data.

While it is possible for programs to implement their own mechanisms for sharing data, doing so is generally cumbersome for the programmer. The programmer may have to implement the sharing mechanism as a tightly integrated part of the program. Even if the programmer can obtain the code for an existing sharing mechanism, the mechanism is often specific to the nature of the program and to the type of data that is being shared. And, when other programs want to share data with an existing program, those programs have to be implemented in such a way such that the same sharing mechanism is used.

While allowing programs to share data presents various issues, the sharing of collections presents additional issues. For many types of collections, the current state of the collection is defined not only by the contents of the collection, but also by the order in which those contents appear. For example, the array {1,2,3,4,5} is different from the array {2,3,1,5,4}. Even though those two arrays contain the same underlying elements (the numbers one through five), the order is different, and thus these two arrays have different states. Maintaining the state of a collection, particularly the ordering, presents certain challenges when the state of a collection may be changed by several programs.

SUMMARY

The notion of a shared collection may be implemented in a way that makes the sharing mechanism transparent to the programmer. Moreover, the mechanism that implements shared collection may provide data convergence for a collection when the collection is being operated on by several different entities.

In one example, a shared object server manages the sharing of collections by maintaining the true state of the collection at any given time. A program that obtains access to a collection may connect to a shared object runtime on the machine on which the program is running. The program that accesses the shared collection registers the collection as a shared collection, and this registration may be communicated by the runtime to the shared object server. Other programs that want access to the collection also register the collection as a shared collection. The registrations, likewise, are communicated by the runtime to the shared object server. Additionally programs can subscribe for change notifications on the collection, where subscription requests are handled by the runtime. Each program maintains a local copy of the collection. When the state of a collection is changed in any way, the runtime on the machine on which the change occurs communicates the change to the shared object server. The shared object server updates the true state of the collection, and communicates the change to all programs that have registered that collection through the shared object runtimes on the machines on which the subscribing programs are running. Each of these programs then updates its local copy of the collection in accordance with state changes communicated by the server. In the event that concurrent changes have occurred on the collection, the shared object server resolves any collisions among changes, and deterministically arrives at the true state of the collection.

In another example, shared objects are managed in a peer-to-peer fashion, rather than in a client/server fashion. In a peer-to-peer implementation, each subscriber to the shared collection may communicate changes to other subscribers. Then, the runtimes on the machines on which the subscribers run may change their local copies, while deterministically resolving any collisions.

Collections may be implemented in nearly any programming language (e.g., C, C++, Java, Visual Basic, etc.). Since the notion of a shared collection can be implemented in a wide variety of programming models, programs written in different language may operate on the same shared collection. Moreover, a programmer may write a program that operates on a shared collection in the same manner as the program would operate on a purely local collection. Thus, programs may be able to operate on shared collections without having to recognize the shared nature of the collection in any manner other than by issuing instructions to register a new collection or to subscribe for changes to an existing collection. In this way, the sharing of collections effectively is made transparent to the program and to the programmer. Additionally, the sharing mechanism may be agnostic to the type of data in the collection, thereby allowing collections of any type of data to be shared.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
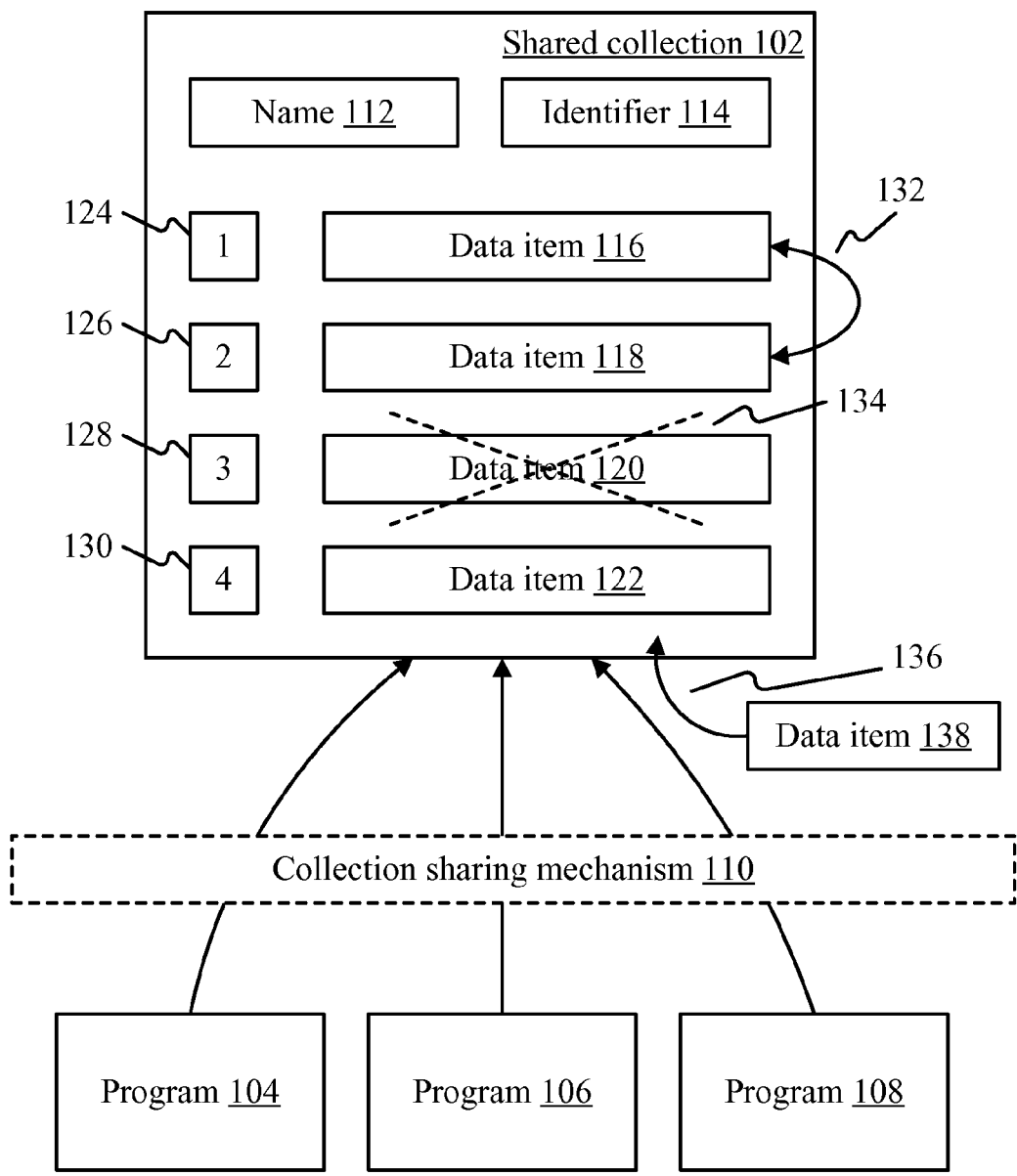
FIG. 1 is a block diagram of an example of a shared collection.

In modern computing, programs often interoperate with each other by sharing access to the same underlying data. When programs share data, the programs are often implemented in a way that is cognizant of the fact that data is being shared. That is, the program generally has to contain implementations of the mechanisms that share data with other programs, or with other instances of the same program. Mechanisms for sharing are often specific to both the nature of the data being shared, and to the programmer's design choices. Thus, when two programs want to share data, their respective programmers normally have to agree upon, and implement, a particular sharing mechanism. There are certain generalized mechanisms that allow a limited form of data sharing, but are not well suited for certain situations.

While sharing of any kind of data presents various implementation issues, additional issues are presented when the data to be shared is a collection. A collection is a group of data items that may be operated on together. Some examples of collections include lists, arrays, sets, bags, and various other groupings of data. Some types of collections are ordered. That is, the current state of an order collection is defined not merely by the contents of the collection, but also by the order in which those contents appear. E.g., {1,2,3,4,5} is a collection of data that contains the integers one through five, inclusive. If the collection is ordered, then {1,2,3,4,5} is a different state from {2,3,1,5,4} because these two states have different orders even though they both contain the same items.

When any type of data is shared among programs that are running at the same time, it is possible that two modifications of the data will collide—e.g., one program might try to modify the data at the same time that another program is trying to delete that data. However, an additional complication arises when such a collision occurs and the data that is being shared is part of a collection. One program might request to insert an item after the second item in the collection. Another program might request to delete the second item, thereby making the inserted item the second item. In order to process these changes and to arrive at a true state for the collection, one has to determine which item in the original collection is now second. Since each program may not be aware that the other program is operating on the same collection, both programs may refer to the "second" item in a collection, while having different understandings of which item in the collection is actually second in order.

The field of operational transformation is concerned with mechanisms to allow deterministic ordering of data in computing. Some of these mechanisms may be used to resolve collisions among files that are being operated on at the same time—e.g., how to determine what edits have occurred in a text file that is being edited concurrently by two users. However, these types of techniques generally have not been applied to the type of generalized sharing of collections that is described herein.

The subject matter described herein provides mechanisms to share data collections. The techniques described herein may be used to provide a generalized collection sharing mechanism that allows several programs and/or several instances of the same program to share access to collections. These techniques may allow the programs to be implemented in different programming languages. The techniques may allow a collection of ordered data to be operated on concurrently by plural programs and/or program instances, in such a way that the collection deterministically arrives at a particular state that can be propagated to all programs that are using the collection. Moreover, the techniques described herein may allow programmers to write programs that operate on shared collections in more or less the same way that programs would operate on purely local collections. Additionally, the sharing mechanism may be made agnostic to the underlying type of data in the collection, thereby allowing the same generalized sharing mechanism to be used for any appropriate kind of data. In other words, the various acts described herein may be performed without regard to the contents of the data items in a collection, and without regard to the structure of the contents of those items.

Programs that share data may run on a single machine, or may run on several machines connected through a network. In order to facilitate the sharing of data, each machine on which a program runs may have a shared object runtime. The shared object runtime may help to manage the sharing and synchronization of shared data objects, including shared collections. In one example, a shared object server maintains the true state of a shared collection. When a change is made to a shared collection on a machine, the runtime on that machine notifies the shared object server that of the change. The server may change the true state of the collection in response to the local change. If two programs make concurrent changes to the collection, the shared object server may resolve the changes in order to arrive at a true state, which, to the extent possible, may reflect the state of the collection that both of the programs intended to effect. Thus, if two different programs each change the same collection without knowledge of the other's change, the server may execute one of these changes to create a new state of the collection, and then may transform the other change to reflect (to the extent possible) the change that the other program would have made if it had known the new state of the collection at the time that it made the change. The server notifies the runtimes on the various machines of the change (or the transformed change, if applicable), and programs that have subscribed to the collection update their local copies of the collection in accordance with the change propagated by the server. In another example, collection sharing is implemented in a peer-to-peer-architecture, in which each program that subscribes to a shared collection notifies others of changes that the program has made, and the other subscribers (or runtime components on the machines on which those subscribers are running) synchronize their local copies to the changes without the aid of a server.

When a program creates a collection, the program may issue an instruction to register the collection as a shared collection. This instruction may be received by the runtime on the machine on which the program is running, and the runtime may report the registration to the shared object server. The shared object server then receives a copy of the collection, which represents the initial state of the collection. From that point, the program that created the collection may operate on the collection in much the same manner as it would if the collection were purely local, since the runtime manages the reporting of changes to the shared object server (or to other subscribers, in a peer-to-peer implementation), and the synchronization of state changes received from the shared object server.

If a program wants to use a shared collection that has been created by another program, the program issues an instruction to register the collection. That instruction may be received by the runtime and may be transmitted to the shared object server. The shared object server then knows to notify the runtime on the machine on which the subscribing program is running of any changes to the state of the collection. When a program subscribes to a collection, it may receive a copy of the current true state of the collection, which it may then store as a local collection. The subscribing program may then operate on the shared collection in much the same manner as if the collection were local. In this way, the sharing of collections effectively is made transparent to both the program that creates and registers the collection, and to programs that subscribe to the collection. As noted above, the system may be agnostic as to the nature of the data in the collection, so the sharing mechanism may work with collections that contain any kind of underlying data.

FIG. 1 shows an example of a shared collection 102. Shared collection 102 may comprise a set of data items that relate to each other in some way, and that may be accessed (e.g., read and written) by a plurality of programs, such as programs 104, 106, and 108. Programs 104-108 may be different running instances of the same program (e.g., the same application running on several distinct processes), or may be different programs. Moreover, programs 104-108 may all run on the same machine or on different machines. In either case, programs 104-108 may be described as "distinct," in the sense that they are either different programs, or separate running instances of the same program. A collection sharing mechanism 110 may facilitate the sharing of shared collection 102 among programs 104-108. Example implementations of collection sharing mechanism 110 are described below in connection with FIGS. 2-7.

Shared collection 102 may have a name 112 that allows shared collection 102 to be identified by programs that share a common namespace. As an alternative to name 112 (or in addition to name 112), shared collection 102 may also have an identifier 114, which distinguishes shared collection 102 from other shared collections. Identifier 114 may be applied, for example, to collections to which a name has not yet been assigned, so that these collections can be identified by a system before a "friendly" name has been assigned to the collection.

Shared collection 102 may have a plurality of data items. In the example of FIG. 1, four data items 116, 118, 120, and 122 are shown, although a collection could have any number of data items. Each data item may contain any type of data. Some examples of data that may be stored in a shared collection are more particularly described below in connection with FIGS. 4 and 5. However, as a general example, some types of data that could be stored in a collection are elemental data types such as numbers or words, or more complex programmer-defined data types such as structures that represent tasks on a to-do list, or elements of a user interface. The mechanisms described herein may be agnostic as to the type of data, so that the individual data items in a collection may be anything ranging from elemental data types to complex user-defined data types with elaborate schemata.

In the example of FIG. 1, shared collection 102 is an ordered collection. As described above, an ordered collection is one in which the state of the collection is defined not only by the data items in the collection, but also by an order on those data items. Insertion or removal of a data item changes the state of an ordered collection, but so does a change in position among two existing data items. Thus, each data item in shared collection 102 has an ordinal position. Ordinal positions 124, 126, 128, and 130 correspond to data items 116, 118, 120, and 122, respectively. Thus, data item 116 is in the first position, data item 118 is in the second position, and so on. If one were to change any of the items' ordinal numbers, this change would result in a change in the state of shared collection 102, even if there were no change to the items themselves.

Example operations that may be performed on shared collection 102 include switch operation 132 and delete operation 134. Switch operation 132 exchanges the ordinal position of two (or more) items in a collection, and delete operation 134 removes one of the items in a collection. Also, one could modify a collection by performing an insert operation 136 to add a new data item 138 to the collection. We shall later refer to these operations in the discussion below.

Figure 2:
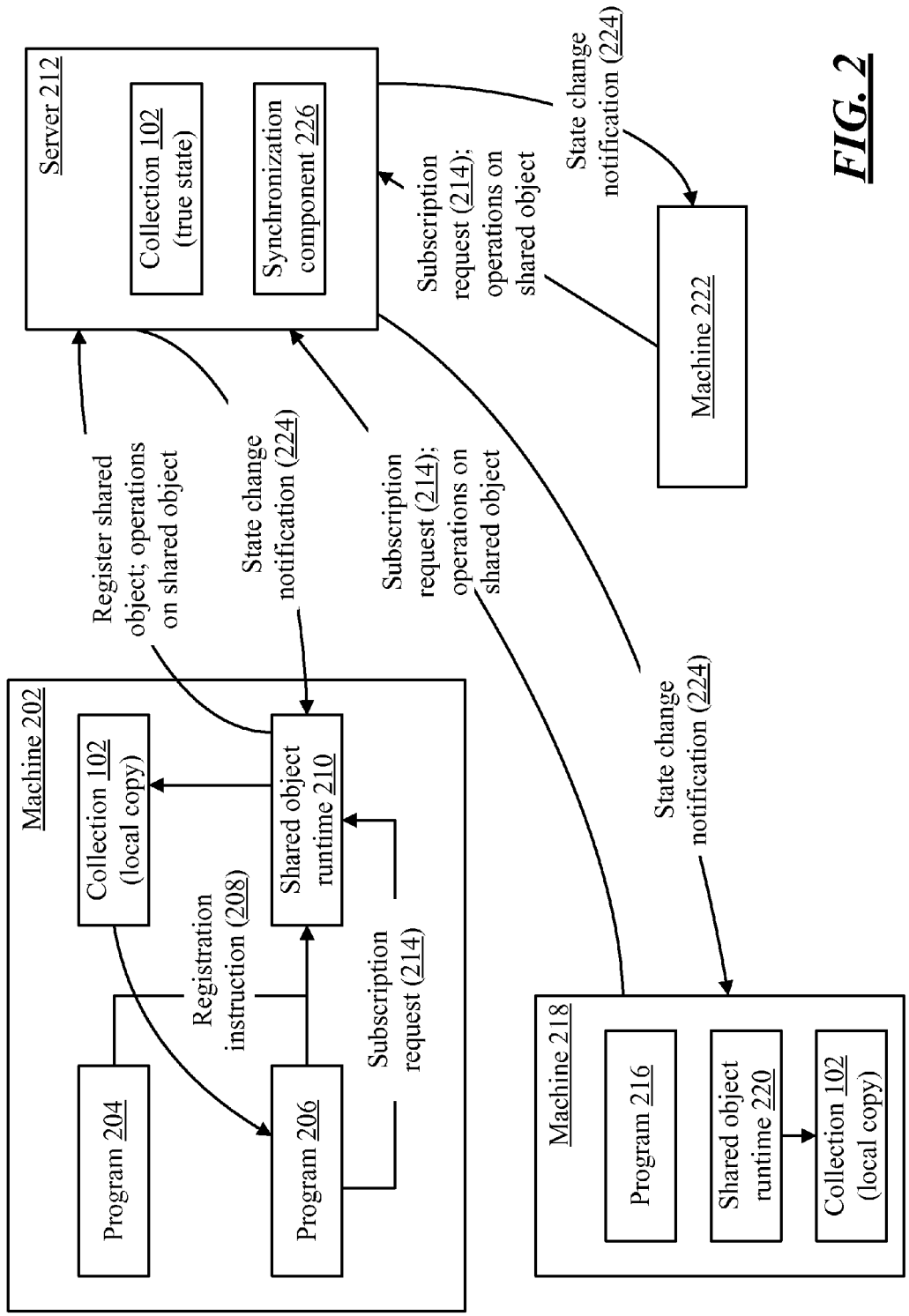
FIG. 2 is a block diagram of an example scenario in which programs may share access to a shared collection.

FIG. 2 shows an example scenario in which programs may share access to shared collection 102. Machine 202 is a machine on which programs execute. Machine 202 could be any type of machine that has some sort of computing capability—e.g., a personal computer such as a desktop or laptop, a server computer, a handheld computer, a smart phone, a set top box, etc. In the example shown, two programs 204 and 206 execute on machine 202, although any number of programs could run on a machine.

Machine 202 may store data, and one type of data that is stored on machine 202 is local copy of shared collection 102. In the example of FIG. 2, shared collection 102 is created by program 204. At the time that the collection is created, the collection may be local and private to program 204. However, program 204 may want to register the collection for sharing, in order to allow other programs (including, possibly, programs that run on other machines) to share access to collection 102. Thus, program 204 issues registration instruction 208. Registration instruction 208 may be issued through whatever programming language program 204 is written in, and may be received by shared object runtime 210. For example, shared object runtime 210 may provide an Application Programming Interface (API) that allows program 204 to issue registration instructions (and subscription requests, and other types of instructions) to shared object runtime 210.

Upon receiving registration instruction 208, shared object runtime 210 may register shared collection 102 with shared object server 212. Shared object server 212 is a server that maintains the true state of shared data objects, such as shared collection 102, and also acts as a clearinghouse for changes to shared objects. That is, shared object server 212 receives notice when shared data changes on a machine, and also propagates, to other machines, changes to the state of that shared data. When shared collection 102 is registered with shared object server 212, shared object runtime 210 may provide a copy of shared collection 102. Once collection 102 has been registered for sharing, shared object server 212 maintains the true state of collection 102, as shown in the box marked "(true state)" inside box that represents shared object server 212 in FIG. 2. (It is noted that, throughout the description herein, we may refer to a program or subscriber sending as sending registration or subscription requests to a server or to other subscribers. The act of a program sending these types of requests includes the case where the program communicates the request to a runtime, and the runtime communicates the request to the server, or to the other subscribers or runtimes. Likewise, as will be described below, subscribers may communicate state changes to a server or to other subscribers; the act of a subscriber's communicating state changes includes the case where the runtime on the subscriber's machine performs the communication.)

When shared collection 102 is registered for sharing, programs other than program 204 may access that collection by subscribing to the collection. In order to subscribe to a collection, the program may submit a subscription request 214. Some collections may be subject to access control restrictions specified by their creators. Such access control restrictions may limit the set of programs and/or users and/or machines that may access a shared collection. However, assuming that there are no access restrictions on shared collection 102 (or that there are access restrictions, but that those seeking access to shared collection 102 have permission to access the collection), then subscribing to shared collection 102 allows the subscriber to read and/or modify that collection.

Subscription requests may come from any program on any machine. For example, program 206 may subscribe to shared collection 102 by submitting a subscription request through shared object runtime 210. It is noted that program 206 is on the same machine 202 as is the creator (i.e., program 204) of shared collection 102. However, a subscribing program could be on a different machine. For example, program 216 on machine 218 also subscribes to shared collection 102 by submitting a subscription request 214. The subscription request from program 216 is submitted through shared object runtime 220, which is the runtime for machine 218. (Each machine may have its own instance of the shared object runtime.) Additionally, subscription requests for shared collection 102 may come from programs executing on machine 222, or on any other machine.

When a program has subscribed to shared collection 102, that program may receive a copy of the current true state of shared collection 102. For example, program 216 on machine 218 receives a copy of shared collection 102, which it may store on machine 218 (as indicated by instance of shared collection 102 labeled "(local copy)" within the box of FIG. 1 that represents machine 218. The subscribing program may then read and write the local copy as if it were a purely local collection. The instance of the shared object runtime on the machine on which the program runs (e.g., shared object runtime 220, in the case of program 216) may monitor the local copy of shared collection 102 to determine whether the program has made changes to the shared collection that are to be reported to the shared object server 212.

When any subscriber to shared collection 102 performs an operation that makes a change to its local copy of shared collection 102, the shared object runtime on that subscriber's machine reports the operation to shared object server 212. Shared object server 212 then updates the current true state of shared collection 102, and notifies subscribers to the object (including the creator of the object) of the state change.

Shared object server 212 may contain a synchronization component 226, which facilitates the collection and propagation of state information among subscribers to shared collection 102. The way in which synchronization component 226 operates may be implementation dependent. In one example, synchronization component maintains a master copy of shared collection 102 in its true state, and simply propagates a new copy of shared collection 102 whenever the state of that collection changes. In another example, synchronization component 226 maintains a list of changes to shared collection 102 relative to the current version, and propagates those changes to the various clients. The runtime on each client is then able to calculate the true state of shared collection 102 based on its local state and on the changes received from shared object server 212. Even if shared object server 212 does not propagates a full copy of shared collection 102 in response to every state change, shared object server 212 may determine how to resolve concurrent changes to shared collection 102, so—when a client-side runtime receives notice of the change—it can calculate the new state of shared collection 102 from the old state. As described below, synchronization component 226 may transform changes, as appropriate, so that changes that a first subscriber made without knowledge of a second subscriber's concurrent changes can be sent to the first subscriber, and can be applied in a way that makes sense, and that results in all subscribers converging on the same state of shared collection 102.

One function performed by synchronization component 226 may be to determine how to apply changes that were made to a collection by two clients, where neither client had knowledge of the other's changes. This situation may arise if two clients make changes that involve the same item in a collection at about the same time, so that each client makes changes before receiving notice of the other's changes. For example, suppose that the first two items in a collection are alpha and beta. Two clients—call them A and B—both make changes to the collection at about the same time. A wants to add a new item, gamma, in the position after alpha, and B wants to delete beta. So A performs the operation of adding a new item at ordinal position two, and B performs the operation of deleting the item at ordinal position two. If A's operation is executed first, then the final state after both operations is that alpha and beta occupy positions one and two, respectively. If B's operation is executed first, then the final state after both operations is that alpha and gamma occupy ordinal positions one and two, respectively. Synchronization component 226 may resolve this apparent conflict in the following way.

For the purpose of this example, call the server S and the clients A and B. S, A, and B all start at state 0. A executes operation X and B executes operation Y. Since neither A nor B has any knowledge that another operation has been performed, A and B each report the operation to S with state 0—that is, A and B each report that they have performed an operation on the collection, as that collection exists in state 0. Having performed one operation, A and B now each increment their state to 1. One of these operations, however, will arrive first at S. Suppose, for this example, that X arrives first. Since operation X was executed at state 0, which matches the current state of S, it is executed on S and sent to B without being transformed. Additionally, an acknowledgement is sent to A. S is now at state 1. At this point, B receives operation X from S. Since operation Y has not yet been acknowledged by S, operation X is transformed against Y, and then applied to the collection. B is now at state 2. When operation Y arrives at S, that operation indicates that it was performed at state 0. Since 0 is no longer the current state of S, S determines that B was unaware of operation X when it executed Y. Therefore, operation Y is transformed against operation X and then sent to A. An acknowledgement is sent to B. S is now at state 2. At this point, A receives the transformed version of operation Y. Since A has no outstanding operations, it applies the transformed Y without transforming it further. (I.e., the transformed Y indicates that it is being performed against state 1. Since A is already at state 1, there is no basis to transform Y any further.) A is now at state 2. Additionally, the copies of the collection at both A and B now show the same data in the same order.

Figure 3:
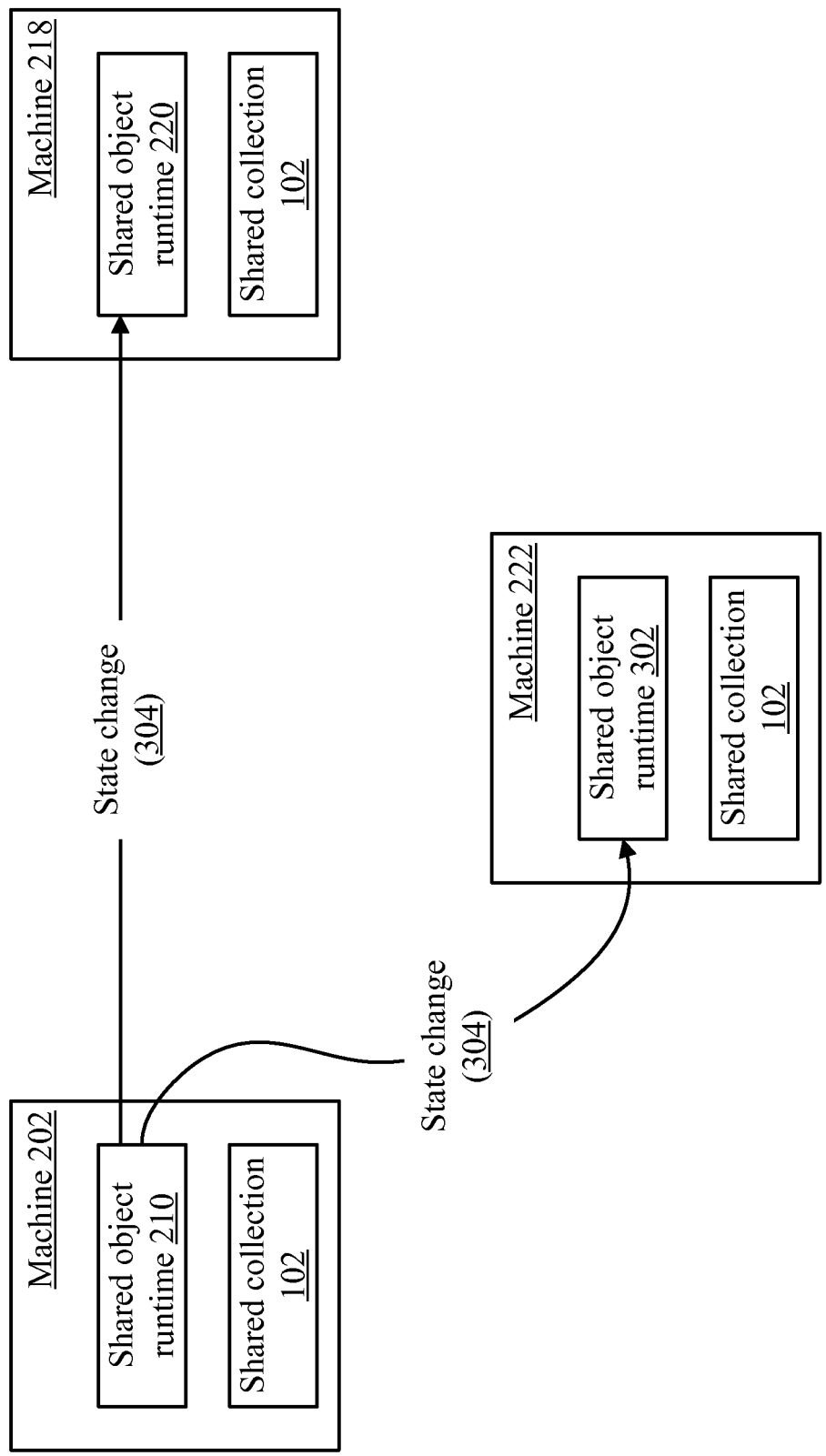
FIG. 3 is a block diagram of an example of a peer-to-peer implementation of collection sharing.

FIG. 2 shows an example client/server-type implementation, in which a server administers the sharing of collections. However, a peer-to-peer implementation may also be used. FIG. 3 shows an example of a peer-to-peer implementation of collection sharing.

In the example of FIG. 3, machines 202, 218 and 222 participate in the sharing of collection 102 (as they do in FIG. 2). For example, each machine may have one or more programs that are subscribers to shared collection 102 (where the creator of the shared collection is included in the concept of a "subscriber"). Each machine has an instance of a shared object runtime—i.e., shared object runtimes 210, 220, and 302 operate on machines 202, 218, and 222, respectively. In the peer-to-peer implementation, the shared object runtimes may communicate with each other directly, rather than communicating with a server. Moreover, the shared object runtimes may be responsible for transforming incoming changes, rather than having those changes performed by the server. Thus, the current state of collection can be known deterministically, as long as the different runtimes implement the same algorithm for resolving conflicting changes to a collection.

If shared collection 102 is changed, for example, on machine 202, then the shared object runtime 210 on machine 202 sends out a notice of state change 304 to the shared object runtimes 220 and 302 on machines 218 and 222. Each of the shared object runtimes applies state change 304 to the current state of shared collection 102, in order to arrive at the new state of collection 102. In the event that two different state changes come from two different machines concurrently, the shared object runtimes may apply a conflict resolution algorithm (e.g., the algorithm described above in connection with synchronization component 226) to determine what state changes are to be applied. As noted above, the algorithm may be made deterministic, so that any two runtimes that receive the same set of conflicting changes can resolve the conflict in the same way, thereby leading the collection to be changed to the same state on the various different machines.

Figure 4:
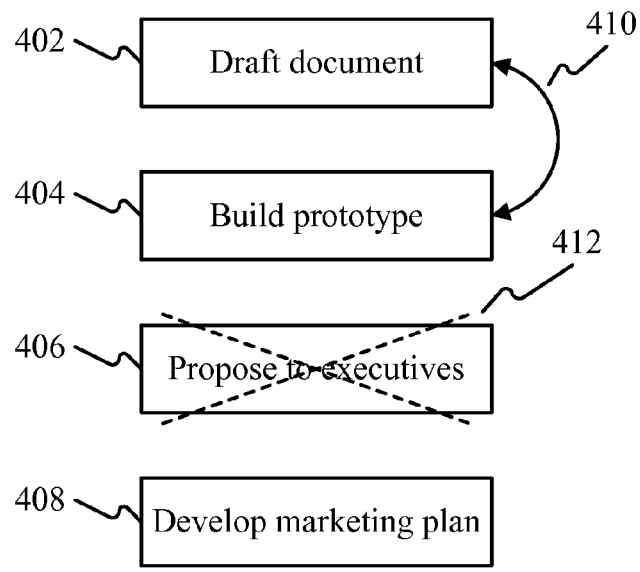
FIGS. 4 and 5 are block diagrams of some examples of how shared collections may be used.
Figure 5:
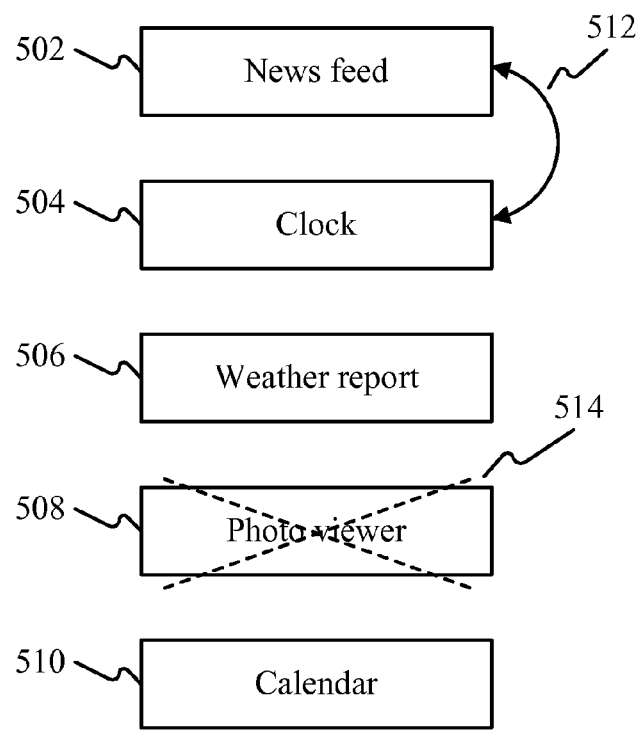

FIGS. 4 and 5 show some examples of how shared collections may be used. The examples in FIGS. 4 and 5 are illustrative, and are not limiting of the subject matter herein. They are provided merely to give a few specific examples of how a shared collection might be used, although it will be understood that there are numerous other contexts in which a shared collection could be used.

FIG. 4 shows an example task list, which may be implemented as a shared collection. Each item in the task list may be a task to be performed. The task list shown contains four example items, 402, 404, 406, and 408, which might be tasks to be performed by a working group that is developing a new product for a company. The task list may be implemented as a collection, where each task to be performed is an item in the collection, and where an order is defined among these items representing the order in which these items are to be performed. Members of the working group might all have control over the task list. For example, the task list might be accessed through an e-mail and calendar program, of which each member of the group is running an instance. Thus, different members of the group might add or delete items on the list, or might rearrange existing items. Thus, each instance of the program may be a subscriber to the collection that represents the task list. When any member of the group uses his or her instance of the program to make a change to the task list, that change may be propagated to other instances of the program in the manner described above. So, a person might use a first instance of the program to switch the order of the first and second tasks (as indicated by numeral 410), and another person might use a second instance of the program to delete the third task (as indicated by numeral 412). These changes could be processed, and a new state of the collection could be arrived at.

FIG. 5 shows an example user interface, which may be implemented as a collection. The user interface may, for example, by a desktop sidebar, where the various data items shown in FIG. 5 (i.e., data items 502 504, 506, 508, and 510) are widgets to be shown in the sidebar in some vertical order that corresponds to the order in which the items appear in the collection. The list of widgets could be implemented as a collection, and different programs could share access to the collection. For example, a user might decide that he would rather have the clock on top of the news feed, and thus might switch the order of the first two elements in the collection (as shown by numeral 512). Then the user might report a bug in the sidebar to an information technology administrator. The administrator might then use an administration program to connect to the sidebar. The administrator might recognize, say, the photo viewer as having a bug, and thus might delete that widget from the sidebar (as indicated by numeral 514). In this way, two people use two different applications to modify a user interface that is implemented as a collection.

It is noted that, in the examples of FIGS. 4 and 5, the collections shown may involve complex data types. For example, the data items in FIG. 4 are tasks (which may contain fields for a summary, a long description, a due date, a reminder date, etc.). And the data items in FIG. 5 may be application handles (which may contain fields such as the name of the application, its location on disk, runtime parameters, etc.). In other words, these examples show that any type of data may be used in a shared collection, and the collection sharing mechanisms can handle various types of data in the same manner, without regard to the nature or structure of the data.

Figure 6:
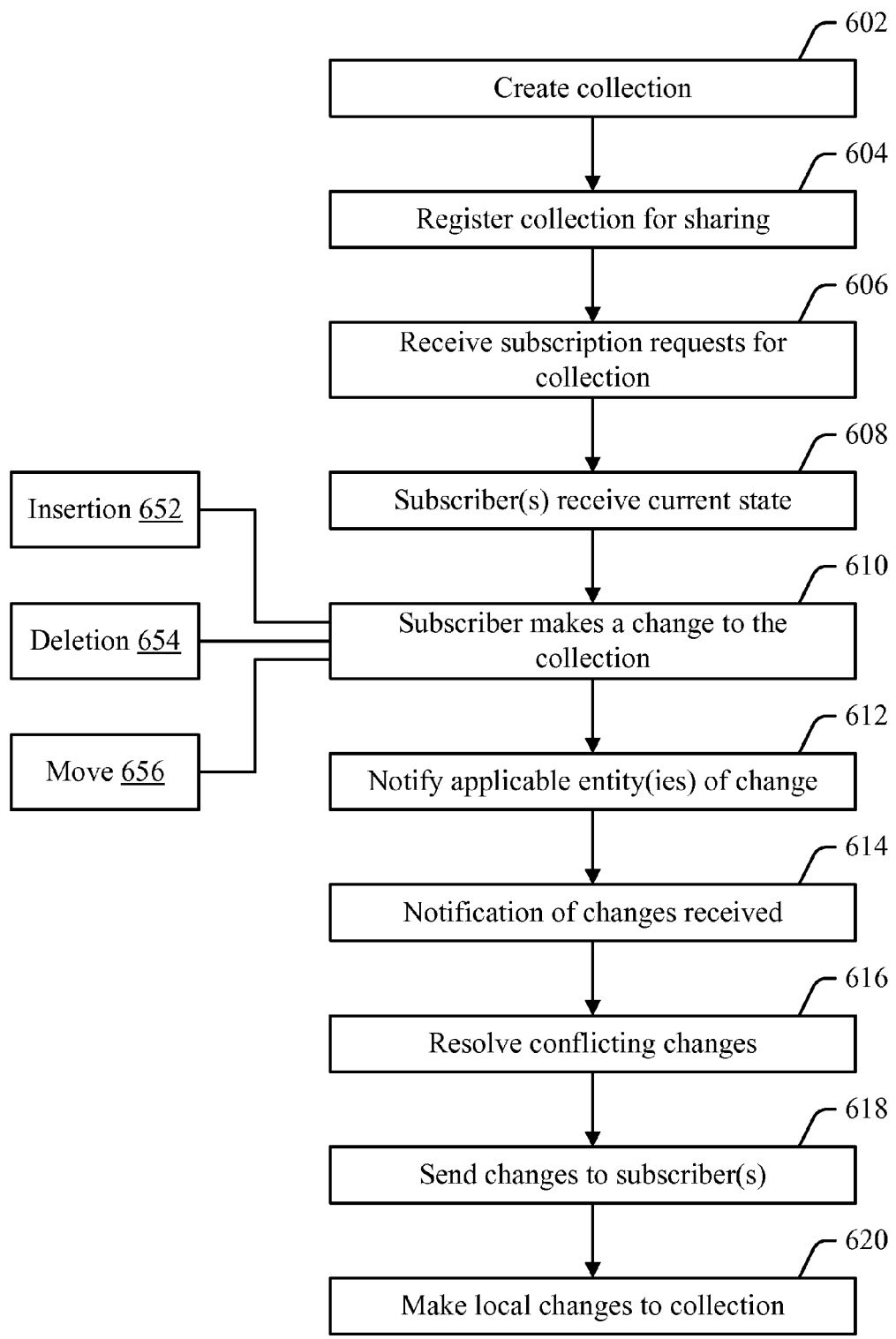
FIG. 6 is a flow diagram of an example process in which a collection may be shared.

FIG. 6 shows an example process in which a collection may be shared. Before turning to a description of FIG. 6, it is noted that the flow diagram of FIG. 6 is described, by way of example, with reference to components shown in FIGS. 1-5, although the process of FIG. 6 may be carried out in any system and is not limited to the scenarios shown in FIGS. 1-5. Additionally, the flow diagram in FIG. 6 shows an example in which stages of a process are carried out in a particular order, as indicated by the lines connecting the blocks, but the various stages shown in this diagram can be performed in any order, or in any combination or sub-combination.

At 602, a collection is created. For example, a program may create the collection, which it may do by using mechanisms that would normally be used to create a local collection. The collection may be any type of collection—e.g., list, array, etc. At 604, the collection may be registered for sharing. For example, the program that creates the collection may issue an instruction, which may be received by the shared object runtime on the machine on which the program is running. In one example, the runtime exposes an API that allows the program to issue a registration instruction, although the registration instruction could be issued in other ways.

After the collection is registered for sharing, subscription requests for the collection may be received (at 606). For example, other programs that share the same name space as the program that created the collection may issue subscription requests for that collection. These subscription requests may be issued to the shared object runtime on the machine on which the subscribing program is running. In one example, subscription requests may be issued through an API that the runtime exposes. For the purposes of the subject matter herein, the creator is considered to be one of the subscribers. (Even though the creator issues a registration request rather than a subscription request, the creator of the shared object is a subscriber in the sense that the subscribers are those programs that can access the collection.) Subscribers may receive the current state of the collection (at 608), and they may store local copies of the collection.

At some point, a subscriber makes a change to the collection (at 610). Example changes include insertion 652, deletion 654, and move 656. Insertion 652 adds a new item to the collection at a particular place in the collection's order. Deletion 654 removes an existing item from the collection. Move 656 reorders changes the order among two or more items in the collection.

When the change is detected by the shared object runtime on the subscriber's machine, the shared object runtime notifies the applicable entity(ies) of the change (at 612), and these changes are received by those entity(ies) (at 614). Which entities are the "applicable entities" may depend on implementation. As noted above, there are, for example, both client/server and peer-to-peer implementations of the subject matter described herein. In the client/server implementation, the runtime that detects the change may notify the shared object server that manages the true state of the collection. In a peer-to-peer implementation, each runtime notifies the other runtimes directly.

When the changes to the collection are received, any conflicting changes (e.g., changes that indicate that two clients have performed operations on the same state of the collection) may be resolved in a deterministic manner (at 616). For example, if two subscribers have made changes that affect the "second" item in the collection (e.g., one entity switches the positions of the first and second entities, and another entity, concurrently, deletes the second entity), these conflicting changes may be resolved in order to arrive at the true state of the collection—e.g., using the algorithm described above in connection with synchronization component 226 (shown in FIG. 2). The way in which the conflicts are resolved may or may not effectuate the intent of the subscribers that made the changes, but the resulting state can be determined unambiguously.

In a client/server implementation, the resolved changes may be sent to the subscribers (at 618). In a peer-to-peer implementation, the subscribers and/or the runtimes on the subscribers' machines receive the change information from the other subscribers and/or runtimes, and resolve conflicts themselves without the aid of a server. A deterministic conflict resolution process allows each client to resolve the change in the same manner, so that the various subscribers may converge on the same result for the true state of the collection. (Again, the resulting state can be resolved unambiguously, but the resulting state may or may not effectuate the intent of the subscribers that made the changes.)

When any existing conflicts to changes have been resolved (and when the result of that conflict resolution has been communicated from the server to the subscribers, in the case of a client/server implementation), changes to the local copies of the collection may be made (at 620) in order to keep those local copies in line with the true state. The subscribers may then continue to read and write the collection.

Figure 7:
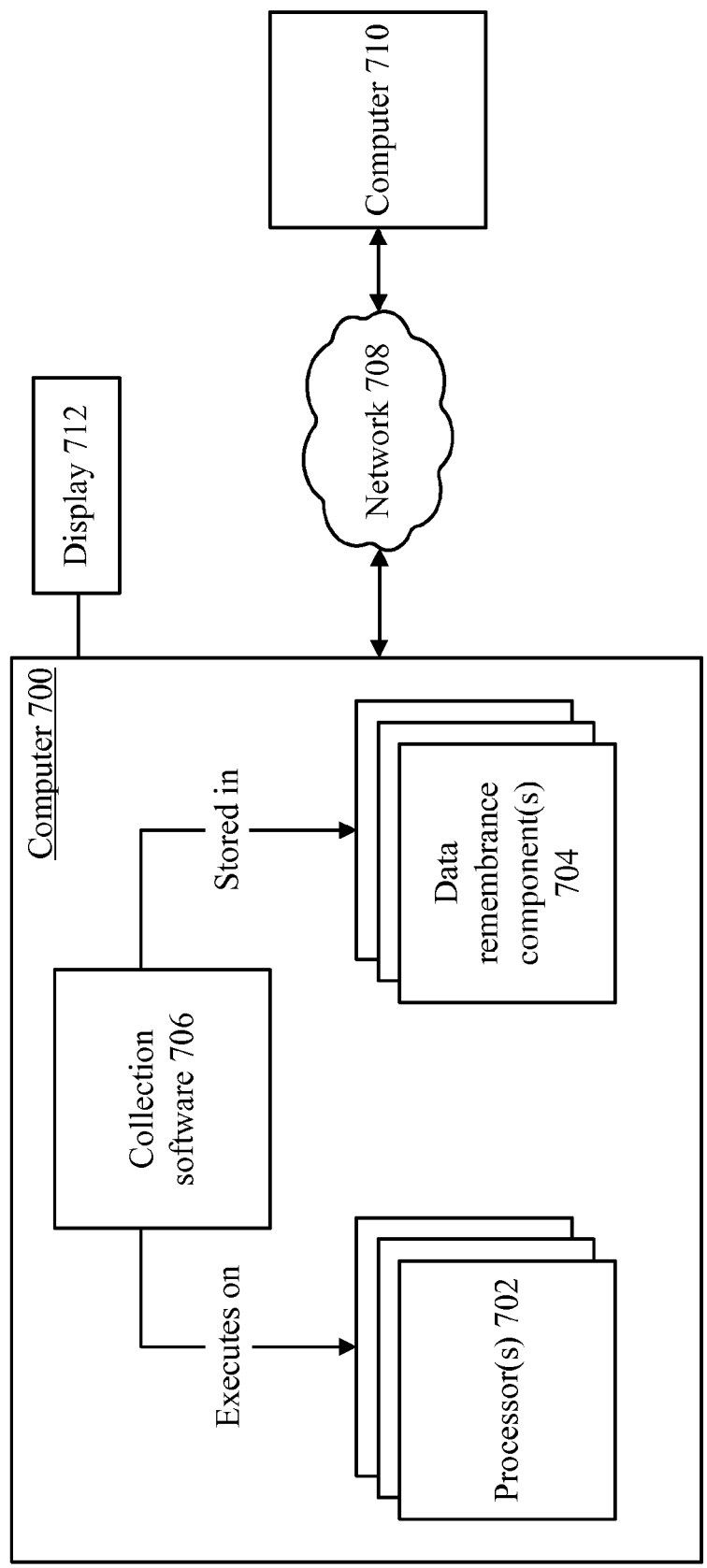
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is collection sharing software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 702) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices that store executable instructions to share a data collection, wherein the executable instructions, when executed by a computer, cause the computer to perform acts comprising:

creating said data collection;

issuing, to an object sharing runtime on said computer, an instruction to register said data collection for sharing among subscribers to said data collection, wherein said subscribers are programs that are distinct from a program that comprises said executable instructions;

performing a first operation on said data collection that changes a state of said data collection, wherein said first operation is performed using a mechanism that a programming language, in which said executable instructions are written, provides for performing operations on local collections, said executable instructions using said mechanism to change said state of said data collection as if said data collection were a purely local collection by changing, through said mechanism, only a local copy of said data collection on said computer; and communicating, from said runtime to said subscribers, a first notification of said first operation to cause said subscribers to update, based on said first operation, local copies of said shared collection maintained by said subscribers, said subscribers also receiving a second notification, from a source other than said runtime, that said source has performed a second operation on said data collection, said second operation being distinct from said first operation, said second notification describing said second operation using an ordinal position of an item of said data collection, said ordinal position referring to different items depending on whether said first operation is performed before said second operation or after said second operation, a conflict between said first operation and said second operation being resolved by said subscribers transforming said second operation against said first operation.

2. The one or more computer-readable storage devices of claim 1, wherein said communicating of said first notification from said runtime to said subscribers comprises:
sending said first notification to a server that maintains a true state of said data collection, and that propagates said true state to said subscribers.

3. The one or more computer-readable storage devices of claim 1, wherein said communicating of said first notification from said runtime to said subscribers comprises:
communicating said first notification directly to said subscribers.

4. The one or more computer-readable storage devices of claim 1, wherein said acts are performed without regard to a structure of contents of items in said data collection.

5. The one or more computer-readable storage devices of claim 1, wherein said acts further comprise:
receiving a second notification of a change to said data collection that has been made by one of said subscribers, said one of said subscribers being distinct from said program;
changing a local copy of said data collection based on said second notification.

6. The one or more computer-readable storage devices of claim 1, wherein said first notification comprises a type of operation performed on said data collection, a position in said data collection of an item that is being operated on, and a state of said data collection.

7. A method of facilitating sharing of a data collection, the method comprising:
using a processor to perform acts comprising:
receiving a registration of said data collection, wherein said data collection is created by a first program, wherein said registration is received from an object runtime component on a machine on which said first program executes;
receiving a subscription to said data collection from a second program that is distinct from said first program, wherein there is a set of subscribers to said data collection, and wherein said set of subscribers comprises said first program and said second program;
receiving a first notification that a first one of said subscribers has performed a first operation on said data collection that makes a change to a state of said data collection, said first one of said subscribers having performed said first operation as if said data collection were purely local to said subscriber by using a mechanism that a programming language, in which said first one of said subscribers is written, provides for performing operations on local collections, said mechanism making a change only to a local copy of said data collection maintained by said subscriber;
propagating said change of said state to said set of subscribers to cause said subscribers to update, based on said first operation, local copies of said shared collection maintained by said subscribers;
receiving a second notification that a second one of said subscribers has performed a second operation on said data collection, said second operation being distinct from said first operation, said second notification describing said second operation using an ordinal position of an item of said data collection, said ordinal position referring to different items depending on whether said first operation is performed before said second operation or after said second operation; and
resolving a conflict between said first operation and said second operation by transforming said second operation against said first operation.

8. The method of claim 7, wherein said acts further comprise:
maintaining a copy of said data collection in said data collection's true state;
and wherein said propagating comprises:
communicating said true state to said subscribers.

9. The method of claim 7, wherein said propagating comprises:
communicating, to said subscribers, a description of a change, relative to said subscribers' version of said data collection's state, that result from performing said first operation.

10. The method of claim 7, wherein said acts are performed without regard to a structure of contents of items in said data collection.

11. The method of claim 7, wherein said first notification comprises a type of operation performed on said data collection, a position in said data collection of an item that is being operated on, and a state of said data collection.

12. A system for facilitating sharing of a data collection, the system comprising:
a processor;
a memory; and
a collection sharing component that is stored in said memory and that executes on said processor, wherein said collection sharing component receives a registration request from a first program that creates said data collection on a first machine, that receives a subscription request for said data collection from a second program that executes on a second machine, said first program being distinct from said second program, said first machine being distinct from said second machine, wherein said collection sharing component receives, from a first member of a set of subscribers, a first notification that a first operation that changes a state of said data collection has been performed by said first member, and wherein said collection sharing component propagates, to said set of subscribers, a second notification that said state has been changed, said second notification causing said subscribers to update, based on said first operation, local copies of said shared collection maintained by said subscribers, wherein said set of subscribers comprises said first program and said second program, said first member having performed said first operation on said collection by using a mechanism that a programming language, in which said first member is written, provides for performing operations on local collections, said first member having performed said first operation as if said collection were a purely local collection by changing, through said mechanism, only a local copy of said collection maintained by said first member, said collection sharing component receiving, from a second member of said set of subscribers, a third notification that said second member has performed a second operation on said data collection, said collection sharing component resolving a conflict between said first operation and said second operation by transforming said second operation against said first operation, said first operation being distinct from said second operation, and said first member being distinct from said second member, said second notification describing said second operation using an ordinal position of an item of said data collection, said ordinal position referring to different items depending on whether said first operation is performed before said second operation or after said second operation.

13. The system of claim 12, wherein said collection sharing component maintains a copy of said data collection in said data collection's true state, and wherein said second notification comprises said true state.

14. The system of claim 12, wherein said second notification comprises a description of a change, relative to said subscribers' version of said data collection's state, that result from performing said first operation.

15. The system of claim 12, wherein said collection sharing component propagates said second notification without regard to a structure of contents of items in said data collection.

16. The system of claim 12, wherein said first notification comprises a type of operation performed on said data collection, a position in said data collection of an item that is being operated on, and a state of said data collection.

17. The one or more computer-readable storage devices of claim 1, said data collection comprising a list of widgets in a desktop sidebar.

18. The method of claim 7, said data college comprising a list of widgets in a desktop sidebar.

19. The system of claim 12, said data collection comprising a list of widgets in a desktop sidebar.

20. The system of claim 19, said list of widgets comprising a clock widget.

* * * * *